United States Patent [19]

Beasley

[11] Patent Number: 5,717,655
[45] Date of Patent: Feb. 10, 1998

[54] METHOD FOR PROVIDING UNIFORM SUBSURFACE COVERAGE IN THE PRESENCE OF STEEP DIPS

[75] Inventor: Craig J. Beasley, Houston, Tex.

[73] Assignee: Western Atlas International, Inc., Houston, Tex.

[21] Appl. No.: 829,485

[22] Filed: Mar. 28, 1997

Related U.S. Application Data

[63] Continuation of Ser. No. 423,781, Apr. 18, 1995, abandoned.

[51] Int. Cl.$^6$ .................................. G01V 1/20; G01V 1/36
[52] U.S. Cl. .................................. 367/53; 367/21; 367/56; 364/421
[58] Field of Search .................................. 367/16, 21, 53, 367/56; 364/421

[56] References Cited

U.S. PATENT DOCUMENTS

| | | | |
|---|---|---|---|
| 3,290,644 | 12/1966 | Hoskins | 367/21 |
| 4,914,636 | 4/1990 | Garrotta et al. | 367/56 |
| 4,930,110 | 5/1990 | Bremner et al. | 367/21 |
| 4,970,696 | 11/1990 | Crews et al. | 367/56 |
| 5,430,689 | 7/1995 | Rigsby et al. | 367/56 |
| 5,450,370 | 9/1995 | Beasley et al. | 367/53 |

OTHER PUBLICATIONS

Beasley, Craig J., Quality Assurance of Spatial Sampling for DMO, 63rd Annual Meeting of Society of Exploration Geophysicists, published in Expanded Abstracts, pp. 544–547, 1993.

Vermeer, Gijs J.O., Seismic Acquisition 3: 3–D Data Acquisition, 64th Annual Meeting of the Society of Exploration Geophysicists, published in Expanded Abstracts, pp. 906–909, 1994.

Egan, Mark S.; Dingwall, Ken; and Kapoor, Jerry; Shooting direction: A 3–D marine survey design issue, The Leading Edge, Nov. 1991, pp. 37–41.

*Primary Examiner*—Nelson Moskowitz
*Attorney, Agent, or Firm*—William A. Knox

[57] ABSTRACT

A method for minimizing non-uniform insonification of subsurface formations in the presence of steep dips when advancing a swath of elongated parallel seismic streamer cables along a line of survey. A first acoustic source is stationed at the leading end of the swath and a second source is stationed at the trailing end of the swath. The sources are activated in alternate cycles at preselected timed intervals to provide down-dip and up-dip seismic data sets. The data sets are processed and merged to eliminate objectionable shadow zones.

1 Claim, 4 Drawing Sheets

5,717,655

METHOD FOR PROVIDING UNIFORM SUBSURFACE COVERAGE IN THE PRESENCE OF STEEP DIPS

This application is a continuation of application Ser. No. 08/423,781, filed Apr. 18, 1995, now abandoned.

BACKGROUND OF THE INVENTION

1. Field of the Invention

3-D marine seismic surveys entail towing a swath of elongated seismic sensor arrays. Subsea formations are acoustically illuminated to produce seismic reflection data that are detected and processed by the arrays and associated ancillary equipment. In the presence of steeply-dipping subsea formations, this invention corrects the non-uniform illumination of the formations due to the awkward geometry caused by the steeply-dipping wavefield trajectories.

2. Discussion of Related Art

This method may be applied to any form of seismic operation, be it on land or on sea. However for convenience, by way of example but not by way of limitation, this disclosure will be explained in terms of a marine seismic survey.

In 3-D marine operations, a seismic ship tows a swath including a plurality of parallel seismic streamer cables along a desired line of survey, the cables being submerged by a few meters beneath the water surface. The number of cables that make up a swath depends only on the mechanical and operational capabilities of the towing ship. There may be six or more such cables, spaced about 50 to 100 meters apart. The respective cables may be up to 3000 meters long.

Each streamer cable typically includes about 120, spaced-apart seismic detector groups. Each group consists of one or more individual interconnected detectors, each of which services a single data channel. The group spacing is on the order of 25 to 50 meters longitudinally along the cable. The seismic detectors are transducers that perceive the mechanical activity due to reflected acoustic wavefields and convert that activity to electrical signals having characteristics representative of the intensity, timing and polarity of the acoustic activity as is well known to the art. The detectors are operatively coupled to data-storage and processing devices of any desired type.

An acoustic source such as an array of air guns, is towed in the water by the ship near the leading end of the swath of seismic streamer cables. As the ship proceeds along the line of survey, the source is fired (activated) at selected spatial intervals equal, for example, to a multiple of the seismic detector group spacing, to acoustically illuminate (insonify) the subsurface formations. Assuming the ship travels at a constant velocity such as six knots, the source may be conveniently fired at selected time intervals such as every five seconds, assuming a 50-meter group interval. The wavefield emitted by the source, travels downwardly to be reflected from subsea earth formations whence the wavefield is reflected back to the water surface where the reflected wavefield is received by the detectors and converted to electrical signals as previously explained. The detected electrical signals are transmitted to any well-known signal recording and processing means for providing a physical model of the subsurface.

For a better understanding of a problem to be solved by this disclosure, FIG. 1 shows a source, S, at or near the surface 10 of the water 12. Detectors $D_{i+1}$, $D_{i+2}$, $D_{i+3}$ are disposed near the water surface above a flat-lying formation F. A wavefield emitted from S follows the indicated ray paths to the respective detectors as shown. For example, the ray path from S to $D_{i+3}$ is reflected from incident point IP on formation F. The incident angle $\phi_i$, relative to the perpendicular to F at IP or zero-offset point Z, must equal the angle of reflection $\phi_r$, as in geometric optics, assuming the earth material is isotropic. The surface expression of the subsurface reflection point, R, the midpoint between S and $D_{i+3}$, M and the zero offset point Z are coincident. The incident points of all of the raypaths are evenly distributed along the line as shown.

In regions of steep dip, the symmetrical picture of FIG. 1 is distorted as shown in the 2-D illustration of FIG. 2. Here, with a dip of 45°, while the angles of incidence and reflection $\phi_i$ and $\phi_r$ are equal, the zero-offset point Z, is up-dip of the midpoint M. The surface expression R, of the reflection point (incident point IP) lies not between the source and detector as in FIG. 1, but up-dip of the source S.

FIG. 3 traces a number of raypaths from a source S to detectors $D_{i-1}$, $D_{i+1}$, $D_{i+2}$, $D_{i+3}$, $D_{i+n}$ for a 45°-dipping bed F. The important point to observe in this Figure is the non-uniform spacing of the incident points. Because reciprocity holds, assuming that the earth materials are isotropic, the source and detectors can be interchanged. It is thus evident that when shooting down-dip, the incident points tend to bunch up. Shooting up-dip results in a spreading-apart of the incident points. Because of the complex non-uniform subsurface illumination, significant undesirable shadow zones are formed. The problem becomes particularly troublesome where multiple cables are used in a 3-D swath, due to the additional awkward lateral geometry.

One method for minimizing shadow zones is taught by C. Beasley in U.S. patent application Ser. No. 08/069565 filed May 28, 1993, entitled Quality Assurance for Spatial Sampling for DMO, assigned to the assignee of this invention, the application now having issued Sep. 12, 1995 as U.S. Pat. No. 5,450,370 to Craig J. Beasley et al. That patent is the basis for a paper delivered in 1993 at the 63rd Annual meeting of the Society of Exploration Geophysicists and published in Expanded Abstracts, pp 544–547. That invention provided a method for examining the geometry of the disposition of a plurality of sources and receivers over an area to be surveyed with a view to optimizing the array to avoid shadow zones in the data and to optimize the resulting seismic image. The method depends upon studying the statistical distribution of dip polarity in dip bins along selected CMP azimuths. The method was implemented by rearranging the geometrical disposition of the sources and receivers. It was not directed to the per se problem of non-uniform subsurface coverage and shadow zones in the presence of steep dips.

Another discussion directed to symmetric sampling is found in a paper entitled 3-D Symmetric Sampling by G. Vermeer and delivered 1994 in a paper at the 64th Annual Meeting of the Society of Exploration Geophysicists, Expanded Abstracts, pp 906–909. Here, the authors review the various different shooting geometries involved in land and marine surveys including 2-D, 3-D and 5-D configurations. The presence of non-uniform subsurface insonification is recognized and the need for symmetric sampling to prevent aliasing is emphasized.

M. S. Egan et al., in a paper entitled Shooting Direction: a 3-D Marine Survey Design Issue, published in *The Leading Edge*, November, 1991, pp 37–41 insist that it is important to maintain consistent source-to-receiver trajectory azimuths to minimize shadow zones, imaging artifacts and aliasing in regions of steep dips. They are particularly concerned about 3-D marine surveys in areas where the proposed seismic lines are obstructed by shipping, offshore structures and other cultural obstacles.

There is a need for equalizing the density of the subsurface coverage provided by wide, towed swaths of seismic streamer arrays in the presence of steeply-dipping earth formations in the circumstance where the acoustic source is located at an end of the swath.

SUMMARY OF THE INVENTION

In an aspect of this invention, there is provided a method for providing a more uniform insonification of subsurface earth formations for the purpose of minimizing shadow zones. To that end, a swath of parallel, elongated seismic cables, each including a plurality of spaced-apart seismic detectors, are advanced along a line of survey. A first acoustic source is positioned near the leading end of the swath and a second acoustic source is located near the trailing end of the swath. At alternate timed intervals, the sources launch a wavefield that is reflected from the subsurface earth formations to provide first and second seismic-signal data sets. Means, operatively coupled to the detectors, process and merge the first and second data sets to provide a uniformly-insonified model of the subsurface earth formations substantially free of shadow zones.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

Figure 1:
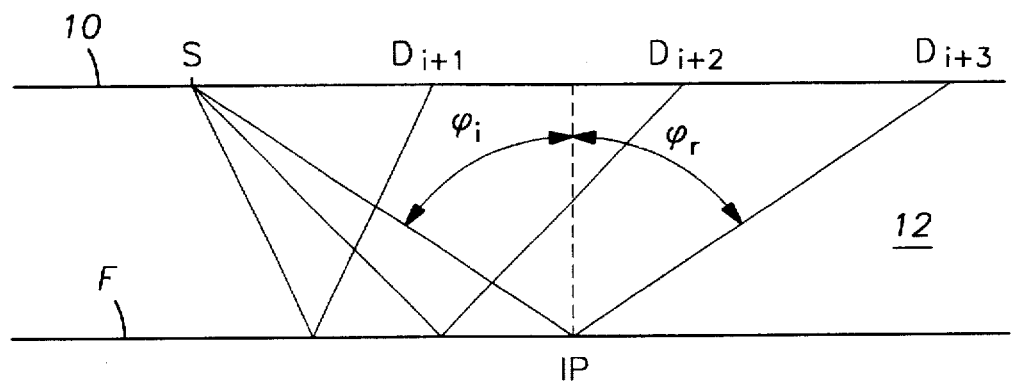
FIG. 1 shows acoustic raypaths in the presence of zero dip.
Figure 2:
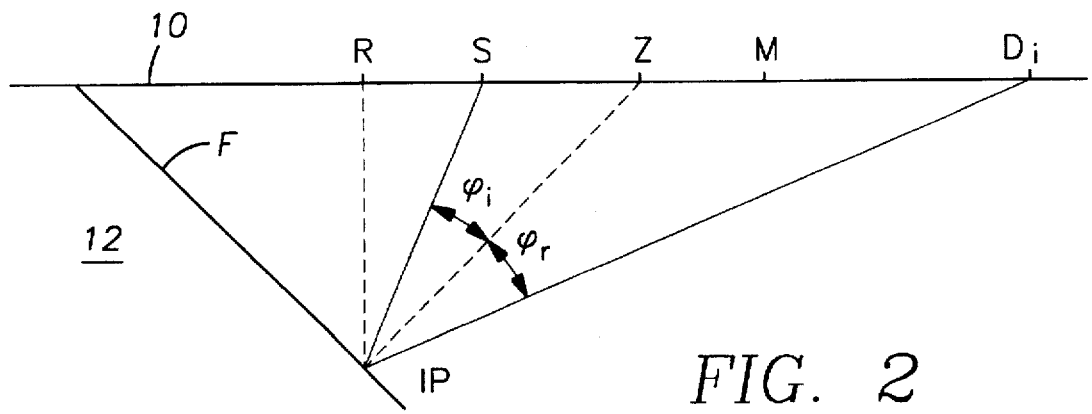
FIG. 2 provides definitions for certain data-processing terms.
Figure 3:
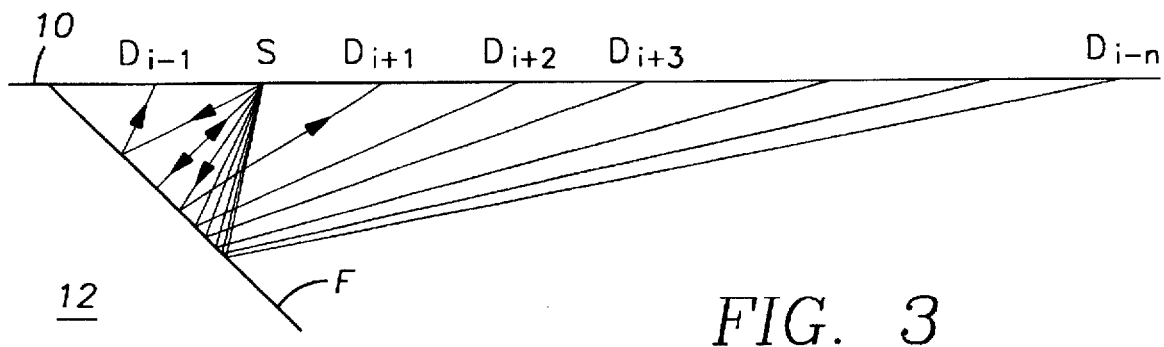
FIG. 3 demonstrates the non-uniform insonification of the subsurface in the presence of steep dips.
Figure 4:
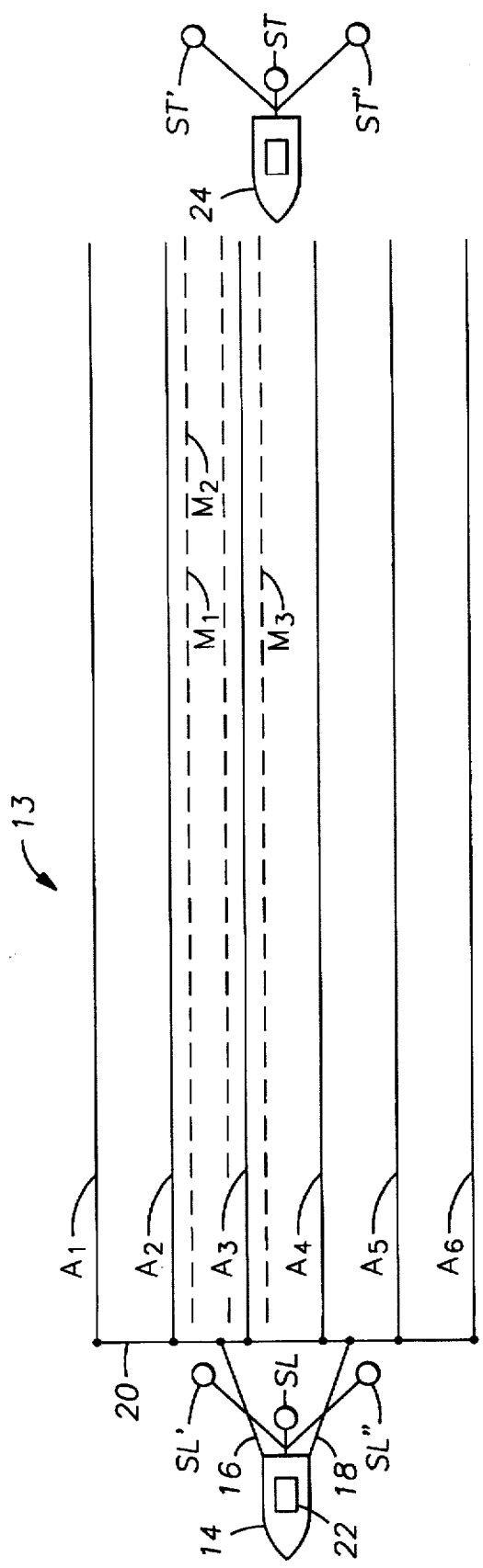
FIG. 4 is a plan view of the configuration of a typical swath of cables and associated acoustic sources such as may be used in 3-D marine seismic surveying.

Please refer now to FIGS. 3 and 4. FIG. 4 is a plan view of a 3-D swath 13 of six parallel seismic cable arrays A1–A6 which are being towed through a body of water by a ship 14. (It should be understood that, if land operations are under consideration, the cables could be towed by one or more trucks or could be laid out by cable trucks using roll-along techniques in a manner well-known to the seismic industry). Signals from the respective cable arrays A1–A6 are fed over a data-signal manifold 20 to a processing means 22 of any well-known type, installed on ship 14 and operatively coupled to means 22 by electrical lead-ins 16 and 18. A discrete acoustic source SL is towed by ship 14 near the leading end of swath 13, substantially at the center of the swath. More than one discrete source such as SL' and SL", offset from the center line may be used if desired.

Dashed line $M_3$ is a line of midpoints that might be associated with seismic cable A3 positioned towards the center of the swath such as suggested by FIG. 3 for a 2-D slice of the earth where it was shown that the subsurface reflection points tend to converge when shooting down-dip. In the case of a 3-D operation, employing the swath of FIG. 4, the laterally-distributed, crossline lines of midpoints corresponding to detector cables A2 and A1 are shown as dashed lines $M_2$ and $M_1$. Similar lines (not shown) may be drawn for cables A4–A6.

Figure 5:
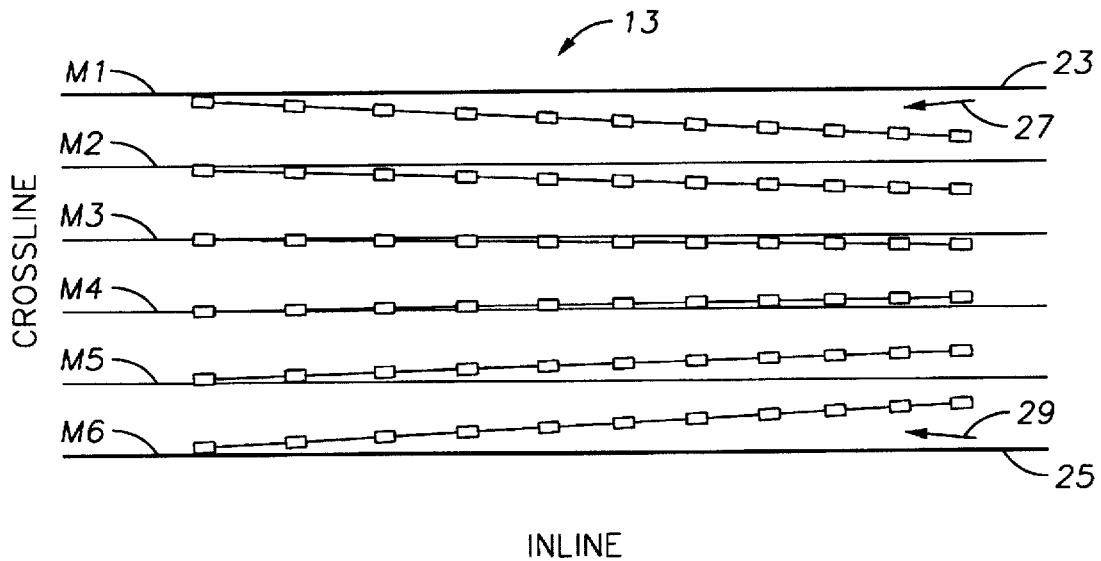
FIG. 5 shows the surface expression of subsurface reflection points and the shadow zones associated with steep dips with respect to a swath where the source is positioned near the leading end of the swath.

FIG. 5 shows, as small rectangles, the surface expression of steeply-dipping subsurface reflection points for every 12th detector of a 120-detector swath of six cables represented as straight, evenly-spaced, horizontal lines A1–A6. With the cables spaced 100 meters apart, the solid lines represent the lines of midpoints for the respective cables and are 50 meters apart, each cable being 3000 meters long. The source SL is at the leading or left hand end of the swath; up-dip and direction of advance of the ship are to the left. As would be expected from FIG. 3, the reflection points tend to converge down-dip along the inline direction. Crossline, the subsurface reflection points do not stray far from the inner central-cable midpoint lines M3 and M4. But the subsurface reflection points for the outer midpoint lines M1, M2, M5 and M6, corresponding to cable A1, A2, A5 and A6 converge towards the center line of the swath 13 by 25 to 30 meters, creating down-dip crossline shadow zones marked by the arrows 27 and 29 at the right hand end of the swath 13.

Under conventional practice, to fill in the shadow zones, the operator would be obliged to resurvey the region by making a second pass over the region. That process is decidedly uneconomical.

Figure 6:
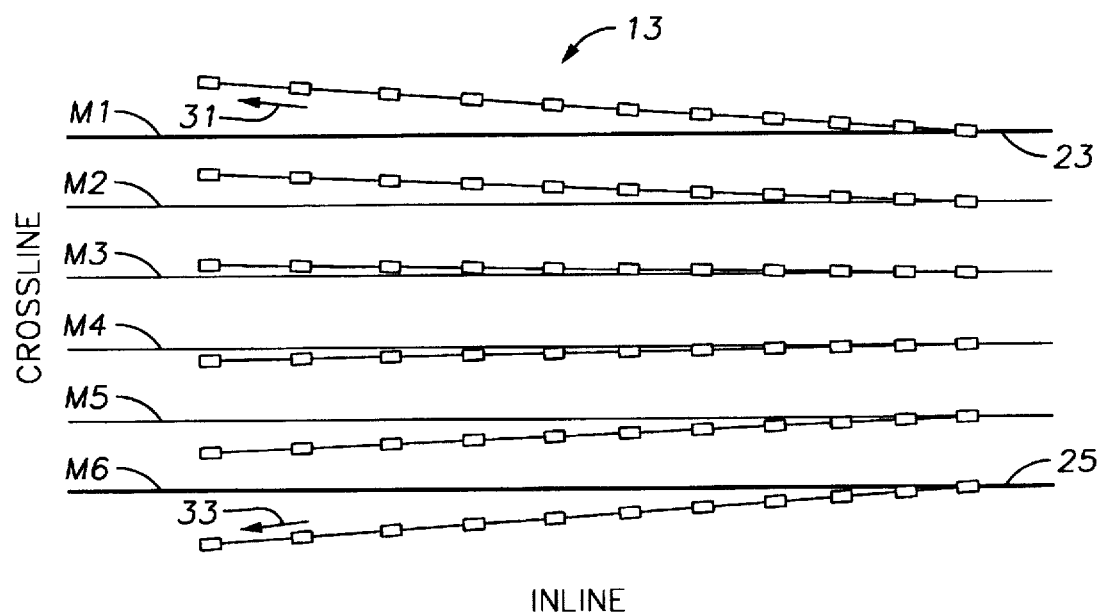
FIG. 6 shows the surface expression of subsurface reflection points and the shadow zones associated with steep dips with respect to a swath wherein the source is located near the trailing end of the swath.

Please refer now to FIGS. 4 and 6. A second ship 24, towing an acoustic source ST launches a wavefield from the trailing end of swath 13. Here, also, more than one discrete source such as ST' and ST" may be used. FIG. 6 shows the subsurface reflecting points (small rectangles as for FIG. 5) associated with every 12th detector for swath 13 when source ST is actuated. As before, the straight horizontal lines M1–M6 represent the midpoint lines that make up swath 13. Here again, the subsurface reflection points for the two middle lines M3 and M4 are nearly coincident with the midpoint lines although significant up-dip in-line and crossline divergence is present. Crossline, the subsurface reflection points diverge well outside the lateral limits of the swath as demarcated by lines 23 and 25, leaving a non-uniformly insonified up-dip zone as indicated by arrows 31 and 33.

Comparison of FIGS. 5 and 6 show that the crossline subsurface coverage provided by the innermost cables A3 and A4 does not depart very much from the line of midpoints regardless of the source location with respect to the leading or trailing end of the swath. But FIG. 5 and 6 suggest that by insonifying the swath from both ends in alternate cycles, the gaps due to non-uniform insonification at the outer crossline swath limits, created by single-ended source activation, can be virtually eliminated when the resulting data are properly processed and merged. By this teaching, a model of the subsurface earth formations results, with the shadow zones filled in completely, as may be seen readily by superimposing (merging) FIG. 5 over FIG. 6. The proposed method is therefore an economic alternative to a resurvey operation that was previously required.

It might be suggested that a single acoustic source could be positioned at the geometric center of swath 13 such that a single activation of a source would produce both an up-dip and a down-dip component such as provided by a conventional split-spread. That process is useful with single cables or widely-spaced dual cables. But for large-scale 3-D swaths or patches that use many closely-spaced cables, that procedure is impractical. The physical configuration of the cables cannot be accurately controlled within the required tolerance in actual operation nor could a ship, which itself may be 20 meters wide, be safely stationed in the middle of the swath without causing cable damage.

In the presently-contemplated best mode of operation, the swath 13 of parallel elongated seismic cables is effectively advanced along a desired line of survey either physically as by towing or by use of well-known roll-along methods. A first acoustic source (or sources), SL is located near the leading end of the swath. A second acoustic source (or sources) ST is positioned near the trailing end of swath 13. The first and second sources are activated at timed intervals in alternate cycles to provide first and second reflected wavefields. The reflected wavefields are detected and converted to first and second data sets of reflected signals. The first and second data sets of electrical signals are processed and merged as indicated in the flow diagram of FIG. 7, to be described later, to provide uniformly-insonified subsurface reflection points along the line of survey. Preferably, the swath is advanced along the line of survey at a constant velocity. The lengths of the first and second timed intervals are substantially constant and designed to allow the swath to advance spatially, at the selected velocity of advance, by some desired multiple of the spacing between detector groups in the seismic cables.

In the event that several discrete acoustic sources are used at each end of the swath, such as SL, SL', SL" and ST, ST', ST", the sources may be activated in some desired alternating sequence such as SL-ST, SL'-ST', SL"-ST", etc., thereby to provide denser subsurface coverage using the same swath of cables.

Thus far, it has been contemplated that the sources are activated sequentially and the reflected wavefields are recorded is a similar sequence. If desired, the leading and trailing sources may be arranged to emit encoded wavefields using any desired type of coding. The respective sources are then programmed to be activated concurrently instead of sequentially. The combined reflected wavefields as recorded are then decoded prior to processing. The advantage to that technique is that the subsurface incident points have improved commonality since there is no time shift and therefore no spatial reflection-point smearing between successive leading and trailing source activations.

Figure 7:
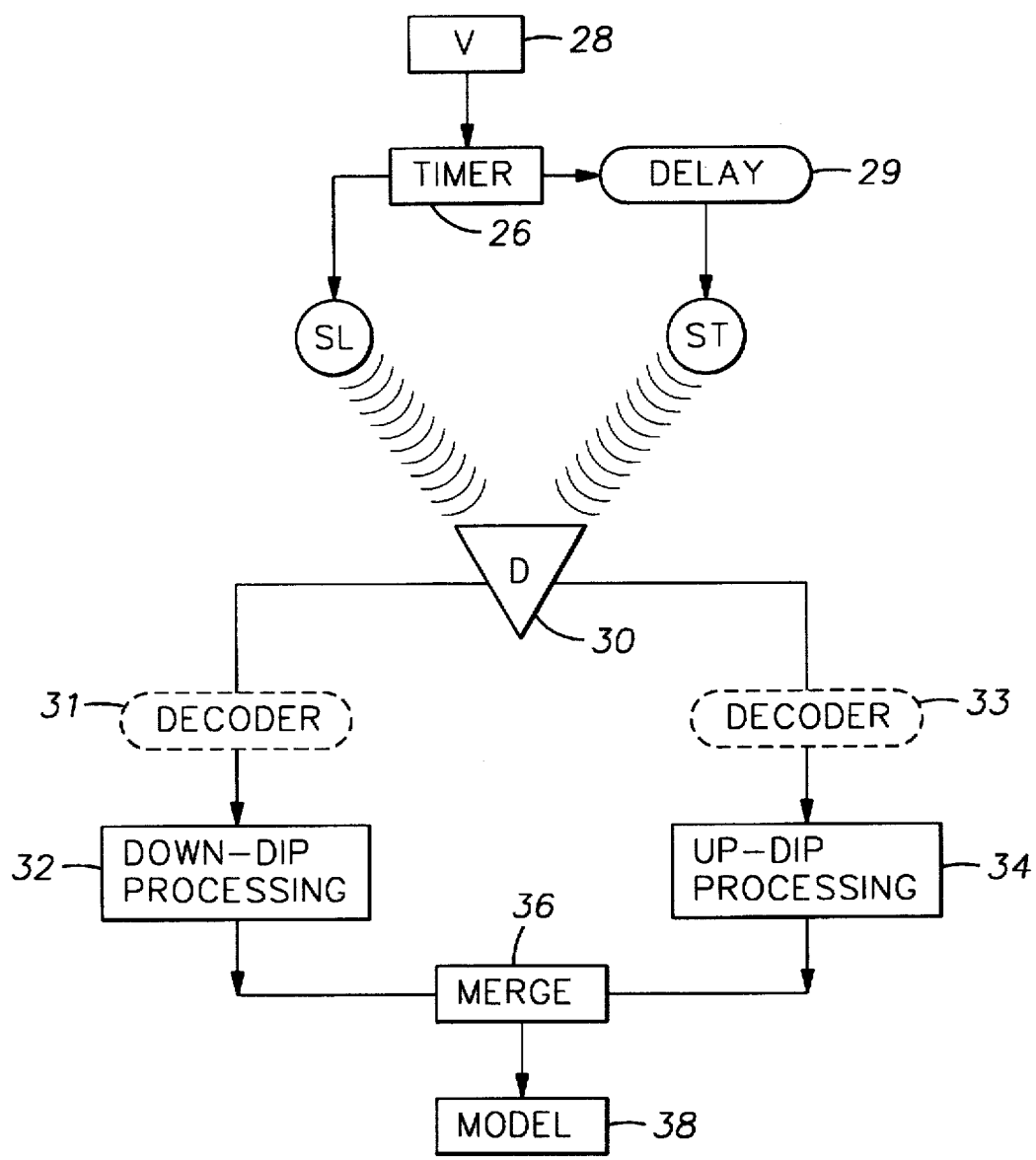
FIG. 7 is a schematic flow diagram of the data processing method.

FIG. 7 is a schematic flow diagram of the data acquisition and processing routine which is implemented by processing means 22 on ship 14. A timer 26 controls the firing rate of sources SL and ST at first and second timed intervals commensurate with the ship's velocity, V, which is input to timer 26 from a velocimeter 28 of any desired type which may be a portion of a satellite navigation system.

Figure 8:
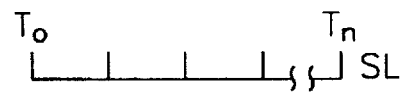
FIG. 8 is a timing diagram for controlling the activation sequence of the acoustic sources.
Figure 8:

Timer 26 causes sources SL and ST to launch a first and a second acoustic wavefield in alternate cycles in accordance with the timing diagram shown in FIG. 8. Assuming that source SL is first activated at time $T_0$ and thereafter repeatedly activated at timed intervals until time $T_n$, source ST is activated at time $t_0$ after a time shift through delay line 29 of half an interval and thereafter repeatedly activated until time interval $t_n$. Timer 28 is preferably installed on ship 14 but sends source-activation commands to source ST on ship 24 by any convenient synchronizing means such as by radio.

Item 30 symbolizes the mass of detectors included by seismic cable swath 13 which is insonified in alternate cycles by the sources SL and ST. The electrical data sets that are derived from down-dip insonification are detected, stored as a first recording and then processed in device 32. Similarly, up-dip data sets are detected, stored as a second recording and processed in device 34. Devices 32 and 34 may be portions of a suitably-programmed computer using any of a number of well-known processing routines such as application of NMO, DMO and migration. If the recorded reflected acoustic wavefields were encoded, of course optional decoders 31 and 33 (dashed outlines labeled DEC) would be inserted between the collective-detector symbol 30 and processors 32 and 34.

Following processing, the processed down-dip and up-dip data sets are merged at 36 to provide a filled-in model of the subsurface such as may be produced by a display device 38 of any desired type.

This invention has been described with a certain degree of specificity by way of example but not by way of limitation. Those skilled in the art will devise obvious variations to the examples given herein but which will fall within the scope and spirit of this invention which is limited only by the appended claims. In particular, this invention has been described with particular reference to marine seismic exploration at sea but the principles involved may be applied equally well to land or shallow water surveying after suitable obvious modifications to the claimed method and system to fit the particular environment.

What is claimed is:

1. A method of 3-dimensional seismic exploration for substantially uniformly insonifying steeply-dipping subsurface earth formations including the steps of advancing a swath of laterally spaced-apart parallel elongated seismic cables over a area of survey, each said cable including a plurality of spaced-apart seismic transducers, the method comprising;

at predetermined time intervals, substantially simultaneously launching a first acoustic wavefield from a point substantially centered ahead of the leading end of the swath, the first wavefield being characterized by a first unique code and launching a second acoustic wavefield from a point substantially centered behind the trailing end of the swath, the second acoustic wavefield being characterized by a second unique code;

detecting and recording the combined first and second encoded acoustic wavefields, following reflection thereof from subsurface earth formations;

decoding the combined recorded reflected wavefields to separate the first and second reflected acoustic wavefields;

separately processing each of the decoded first and second recorded reflected wavefields;

generating a substantially uniformly-insonified model of dipping subsurface earth formations by merging the first and second processed reflected wavefields.

* * * * *